April 30, 1935.                L. CLARKE                1,999,398
CLAMPING EDGING
Filed March 19, 1934

INVENTOR.
Louis Clarke
BY
ATTORNEY.

Patented Apr. 30, 1935

1,999,398

UNITED STATES PATENT OFFICE 1,999,398

CLAMPING EDGING

Louis Clarke, College Point, N. Y.

Application March 19, 1934, Serial No. 716,438

6 Claims. (Cl. 156—19)

The invention relates to edging, whether made of metal, celluloid or other suitable material. It has for its main objects to provide an edging which will automatically clamp itself to the goods on which employed and effectively resist accidental removal. Another object is to so construct this edging that it may serve a great many purposes and be adapted to a great many uses.

A further object is to so construct the edging that it may be bent and shaped to fit the particular object to which applied or the purpose which it is to serve. A still further object is to provide an edging which may be manufactured at low cost and applied to the articles on which used with a minimum expenditure of time and labor. Additional objects are to provide an edging which will eliminate the use of glue, rivets, eyelets and the like; which may be made of any suitable material and finished or ornamented to suit its particular purpose, and which can be used for a great variety of purposes.

Figure 5:
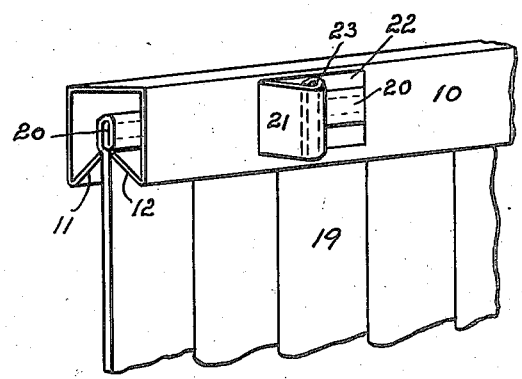
Figure 6:
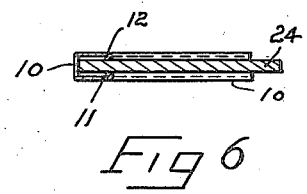

These and various other objects and advantages will be readily understood from the following description and from the accompanying drawing of preferred embodiments of the invention in which, however, modifications may be made without departing from the scope of the appended claims. In the drawing Fig. 1 is a perspective view of one embodiment of the edging, Fig. 2 another perspective view of a slightly modified form, Fig. 3 still another perspective view of a slight modification of the edging shown in Fig. 2, Fig. 4 shows a handbag to which the edging has been applied, Fig. 5 shows a perspective rear view of the edging employed as a drapery support, and Fig. 6 shows the edging applied to a sheet of rigid material, as, for example, cardboard.

Figure 1:
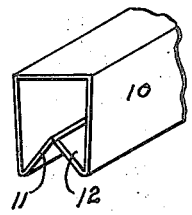

Referring now to Fig. 1, the edging consists of a channel-shaped length of material 10 which has its edges 11 and 12 bent inwardly and up into the channel so that they abut against each other. The channel itself is preferably slightly tapered towards the bends. The edgings may be made of metal, celluloid or any other material having sufficient resiliency to hold the edges 11 and 12 in clamping contact.

Figure 2:
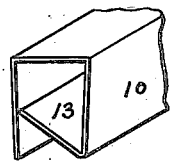
Figure 3:
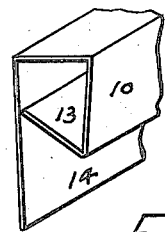

In Fig. 2 only the edge 13 is bent up into the channel. This edge clamps against the opposite side of the channel. Fig. 3 is very similar to Fig. 2, except that the side 14 of the channel is wider than the same side in Fig. 2.

Figure 4:
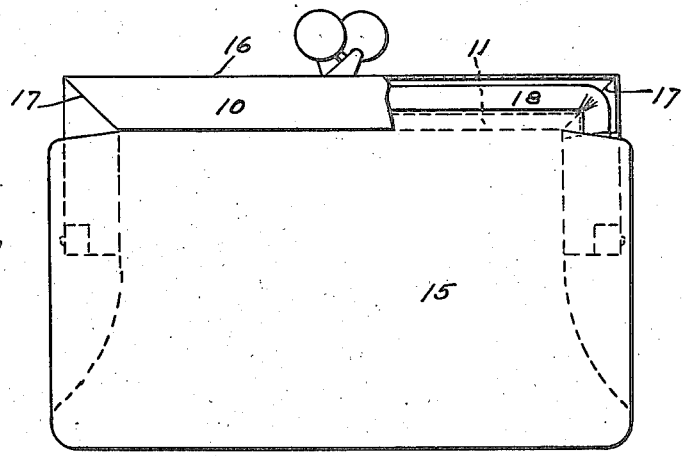

Fig. 4 shows an ordinary handbag 15, the frame 16 of which is constructed from a piece of edging such as shown in Fig. 1. In this instant the corners 17 are formed in the usual manner by cutting out pieces of the edging. The material of which the handbag is made is seamed around the bag opening, as shown at 18, and the edges 11 and 12 clamp the material directly below this seam. It will be noted that the construction of the edging is such that the withdrawal of the seam from between the edges 11 and 12 is practically impossible. While it was said above that the material of which the handbag is made is provided with a seam 18, such a seam is not strictly necessary, particularly on certain kinds of materials, as the bent edges will restrain withdrawal of the material even when unseamed.

Fig. 5 shows how the edging may be used as a drapery or curtain support. In this instant, the drapery 19, a fragment of which is only shown, is likewise supported by a hem 20 which is restrained from withdrawal by the edges 11 and 12. Not only is it possible to suspend draperies, curtains and the like in a straightened out position in the edging but the draperies or curtains may be "gathered", or otherwise draped as shown in the drawing. When the edging is used as a curtain or drapery rod, brackets, such as for example as shown in 21, may be formed right from the material of which the edging is made. In the present case, the bracket is sheared out of the material, leaving an opening 22, and the outer end of this bracket is curled so as to form a socket 23 which will fit over a hook in the usual manner. Of course, various other forms of brackets might be used.

Fig. 6 shows the edging applied to a piece of cardboard or similar material 24. It will be noted that in this case, the bent-in edges 11 and 12 are relatively short, however, the edging is so constructed that prior to its application to the cardboard the edges were in contact with each other. In other words, in its unapplied condition, the edging was more tapered than the edging shown in Fig. 1.

It will be seen that when the edging shown in Fig. 1 is employed, the material to which the edge is applied is held in the center of the edging. In the embodiments shown in Figs. 2 and 3 the material is held close to one side of the edging. There are cases where this is advantageous. The extra length of the side 14, Fig. 3, is primarily for ornamental purposes. This edge may be shaped or formed in various ways to meet different requirements.

While I prefer to construct the edging in long lengths by the "drawing process" and cut these into the lengths required, it is obvious that the edgings may be formed with dies so as to be finished completely for the purpose needed. It will be noted that by tapering the edging, according to the thickness of the material on which it will be used, that the edging, when applied, will assume a rectangular shape.

While I have illustrated and described various uses to which the edging may be put, I do not thereby wish to limit its use to such, or any other particular, uses. Such illustrations and descriptions have merely been made to more readily explain the invention and it is the intention to employ the edging for any purpose which may be found advantageous or expedient.

Having described the invention and its objects, what I claim as new and wish to protect by Letters Patent is:

1. A clamping edging of the class described comprising a channel-shaped structure made of resilient material and having its edges bent into the channel at acute angles and abutting against each other so as to form a clamp for holding material inserted in the channel, and brackets formed on the edging for suspending it and the material held thereby.

2. A clamping edging of the class described comprising a channel-shaped structure made of resilient material and having one of its edges bent into the channel so as to form an angle of less than ninety degrees with the side from which bent, and said bent edge abutting against the opposite side to form a clamp into which material may be inserted by pushing it up into the channel but from which it cannot be removed by a pull in the opposite direction.

3. A clamping edging of the class described comprising a channel-shaped structure made of resilient material and having one of its edges bent into the channel so as to form an angle of less than ninety degrees with the side from which bent, and said bent edge abutting against the opposite side to form a clamp into which material may be inserted by pushing it up into the channel but from which it cannot be removed by a pull in the opposite direction, and the side of the channel against which the bent edge abuts extended below the bend in the other side.

4. A clamping edging of the class described comprising a channel-shaped structure made of resilient material and having one of its edges bent into the channel so as to form an angle of less than ninety degrees with the side from which it is bent, the bent edge in combination with the opposite side of the channel forming a clamp into which material may be inserted by pushing it up into the channel but from which it can not be removed by a pull in the opposite direction.

5. A clamping edging of the class described comprising a channel-shaped structure made of resilient material and having its edges bent into the channel so as to form angles of less than ninety degrees with the sides from which bent, the edges forming a clamp into which material may be inserted by pushing it up into the channel but from which it cannot be removed by a pull in the opposite direction.

6. A clamping edging of the class described comprising a channel-shaped structure made of resilient material and having its edges bent into the channel to form angles of less than ninety degrees with the sides from which bent, and said bent edges abutting against each other to form a clamp into which material may be inserted by pushing it up into the channel but from which it cannot be removed by a pull in the opposite direction.

LOUIS CLARKE.